(12) United States Patent
Gold, Jr.

(10) Patent No.: US 7,650,016 B2
(45) Date of Patent: Jan. 19, 2010

(54) SYSTEM AND METHOD FOR TRACKING MOTION OF AN OBJECT IMAGE

(75) Inventor: V Edward Gold, Jr., Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 665 days.

(21) Appl. No.: 10/902,372

(22) Filed: Jul. 30, 2004

(65) Prior Publication Data

US 2006/0023914 A1 Feb. 2, 2006

(51) Int. Cl.
*G06K 9/00* (2006.01)

(52) U.S. Cl. .................. 382/107; 382/103; 382/104; 382/105; 382/106; 348/169; 348/170; 348/171; 348/172

(58) Field of Classification Search ............. 382/103, 382/104, 105, 106, 107; 348/169, 170, 171, 348/172
See application file for complete search history.

(56) References Cited

U.S. PATENT DOCUMENTS

| | | | | |
|---|---|---|---|---|
| 5,259,040 A * | 11/1993 | Hanna | ................. | 382/107 |
| 5,627,586 A * | 5/1997 | Yamasaki | ................. | 348/169 |
| 5,757,422 A * | 5/1998 | Matsumura | ................. | 348/169 |
| 6,298,143 B1 * | 10/2001 | Kikuchi et al. | ................. | 382/103 |
| 6,298,170 B1 * | 10/2001 | Morita et al. | ................. | 382/103 |
| 6,480,615 B1 * | 11/2002 | Sun et al. | ................. | 382/103 |
| 6,643,387 B1 * | 11/2003 | Sethuraman et al. | ................. | 382/103 |
| 6,819,778 B2 * | 11/2004 | Kamei | ................. | 382/103 |
| 7,158,664 B2 * | 1/2007 | Nagaoka et al. | ................. | 382/103 |
| 2005/0226462 A1 * | 10/2005 | Wittebrood et al. | ................. | 382/103 |

* cited by examiner

*Primary Examiner*—Vikkram Bali
*Assistant Examiner*—Daniel Zeilberger
(74) *Attorney, Agent, or Firm*—Buchanan Ingersoll & Rooney PC

(57) ABSTRACT

A system, method and computer readable medium are disclosed for tracking motion of an object image, by receiving an input image and correlating the input image with a reference image by computing differences between the input image and the reference image. A motion vector is generated for a subimage of the input image using a subimage metric surface, and a tracking assessment of object image motion is output based on the motion vector.

23 Claims, 5 Drawing Sheets

SYSTEM AND METHOD FOR TRACKING MOTION OF AN OBJECT IMAGE

BACKGROUND

Methods and systems for tracking an object image by correlating sequential image frames are known. Correlation tracking requires no a-priori model, or template, and can therefore track movement of an arbitrary object image in scenery over a succession of image frames. Correlation trackers can "walk-off" an object in situations where a human operator would have no trouble identifying an object's true location, and can lose the ability to track the object image in succeeding frames.

A typical correlation tracking operation establishes a reference image which includes, for example, an image of an object in its entirety. In succeeding frames, the correlation tracker tries to compare the previously received reference image to a currently received input image by sliding the reference image around a designated search area of the input image. A summation output, taken over the search area can be produced as a metric surface, wherein a peak (i.e., minimum difference) can be used to indicate a best match between a location of the reference image over the search area to identify the most likely matching location of the object image.

When a best match is determined for a given search area, the system can attempt to quantify the quality of the match. For example, using the detected peak of the metric surface, a motion vector can be determined. The peak can be compared against a threshold criteria and, if the peak satisfies the criteria, the correlation can be considered sufficient to allow the input image to be used in updating the reference image. Reference image update strategies are known which involve blending some percentage of an aligned input image with the reference image. If the peak does not satisfy the threshold criteria, the blending operation can be dropped so that an undesirable input image will not contaminate the reference image.

Known correlation tracking techniques are typically not gain and level invariant, and can exhibit sensitivity to variations in target size, target rotation, partial obscuration and noise. This sensitivity can lead to walk-off and/or loss of track. With walk-off, a tracker remains confident that it is properly tracking an object even through the object has been lost.

Walk-off occurs gradually due, for example, to a contamination of a reference image whereby the correlation tracker incorrectly identifies what it considers to be an accurate location of an object image within the input image. In this case, the threshold criteria does not detect the contamination, and walk-off can occur. A loss of track can occur when a tracker realizes that it is no longer able to track a desired object. This occurs when the tracker is unable to identify any acceptable match within a search area.

SUMMARY

A system, method and computer readable medium are disclosed for tracking motion of an object image, by receiving an input image; correlating the input image with a reference image by computing differences between the input image and the reference image; generating a motion vector for a subimage of the input image using a subimage metric surface; and outputting a tracking assessment of object image motion based on the motion vector.

A system for tracking motion of an object image comprises a processor for correlating an input image with a reference image by computing a difference between the input image and the reference image, and for generating a motion vector for a subimage of the input image using a subimage metric surface; and a tracking assessment processor for outputting a tracking assessment of object image motion based on the motion vector.

A system for tracking motion of an object image, can include means for receiving an input image; means for correlating the input image with a reference image by computing differences between the input image and the reference image; means for generating a motion vector for a subimage of the input image using a subimage metric surface; and means for outputting a tracking assessment of object image motion based on the motion vector.

BRIEF DESCRIPTION OF THE DRAWINGS

Features of the present invention will become more apparent from the following detailed description when read in conjunction with the accompanying drawings, wherein.

DETAILED DESCRIPTION

An exemplary method for tracking motion of an object image will be described in the context of the exemplary functional block diagram of FIG. 1. The FIG. 1 system provides an ability for a tracker to accurately access its validity using subtrackers, each of which is tracking a subimage of an input image. A correlation tracker used with respect to an input image at a reference image can be used to produce any desired number (e.g., four) of subimage metric surfaces. The subimage metric surfaces can be used to produce motion vectors for assessing the validity of a main correlation between the input image and the reference image.

Figure 1:
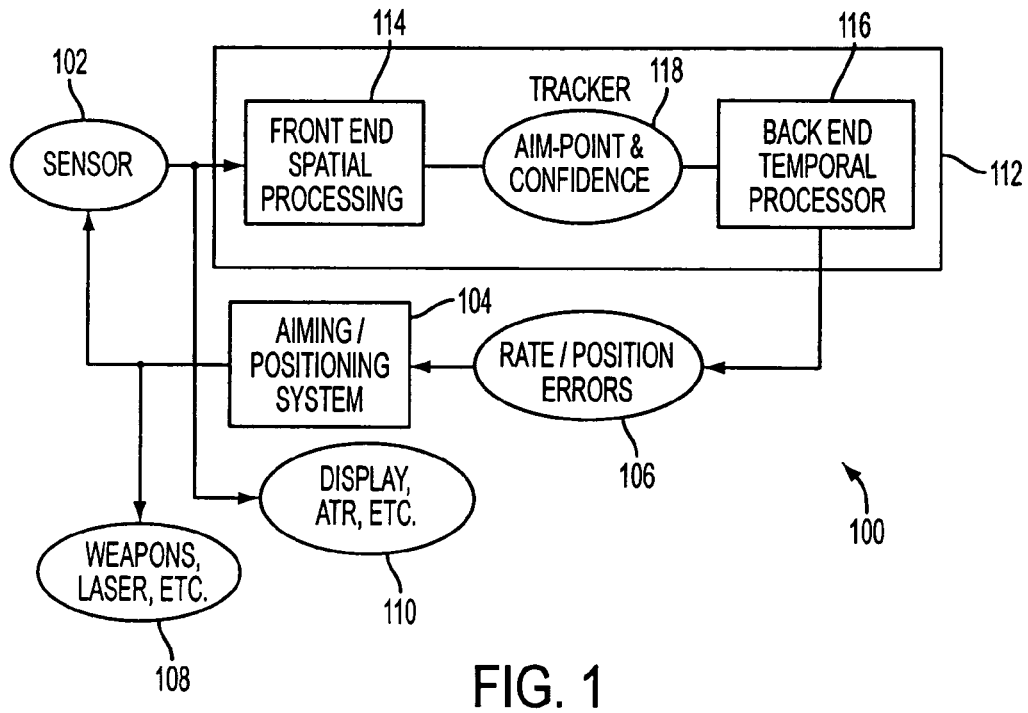
FIG. 1 is an overview of a system configured in accordance with an exemplary embodiment of the present invention.

Referring to FIG. 1, a tracking system 100 is illustrated for aiming an object tracking device. Such a system can be used, for example, for designating a target and/or for guiding the device, such as an airborne missile, to a target.

The FIG. 1 system includes an image receiving means represented as a sensor 102 (e.g., optical image sensor or any other suitable sensor) for providing feedback, such as rate and position feedback, from an aiming/positioning system 104. The aiming/positioning system 104 receives control signals representing rate/position errors, or any other servo control signals via a rate/position error device 106. The error signals generated by the rate/position error device 106 are produced on the basis of outputs from a tracker configured in accordance with exemplary embodiments described herein.

Control signals from the aiming/positioning system 104 can be used, in the designation and/or guidance of devices, such as weapons (e.g., airborne missiles), lasers and so forth generally represented by a controlled device block 108. Feedback information from the sensor 102 can also be provided to a user interface 110, such as a display. Those skilled in the art will appreciate that any information from any location of the system can optionally be presented to the user via the user interface 110.

Exemplary embodiments of the present invention are directed to using a tracker 112 with processing capabilities in accordance with the present invention. In accordance with the exemplary embodiments, a front end processing block 114 is modified to produce multiple track error signals which can track different subcomponents of an object image. Exemplary embodiments can provide an improved aimpoint and confidence output 118 from the front end spatial processing block 114 for input to a back end temporal processor 116. The improved output 118 can be used to enhance the confidence of rate/position error signal supplied to the aiming/positioning system 104.

In tracking motion of the object image, the front end processing block 114 constitutes a computer processor having means included therein which are configured for correlating an input image with the reference image. Details of an exemplary front end processing block 114 are shown in FIG. 2, wherein the functions of a processor for correlating an input image with the reference image are illustrated.

The processor 202, computes a difference between an input image 204 and a reference image 206, and generates a motion vector for a subimage of the input image using a subimage metric surface. A tracking assessment processor, having a hypothesis engine 208, constitutes a means for outputting a tracking assessment of object image motion based on a motion vector received from the correlation processor 202. Outputs of the hypothesis engine 208 can be supplied to a main tracker 210 which includes, for example, the aiming/positioning system 104 of FIG. 1. The aiming/positioning system 104 can include steering optics which are controlled in response to an output(s) of the tracking assessment processor 208.

Figure 2:
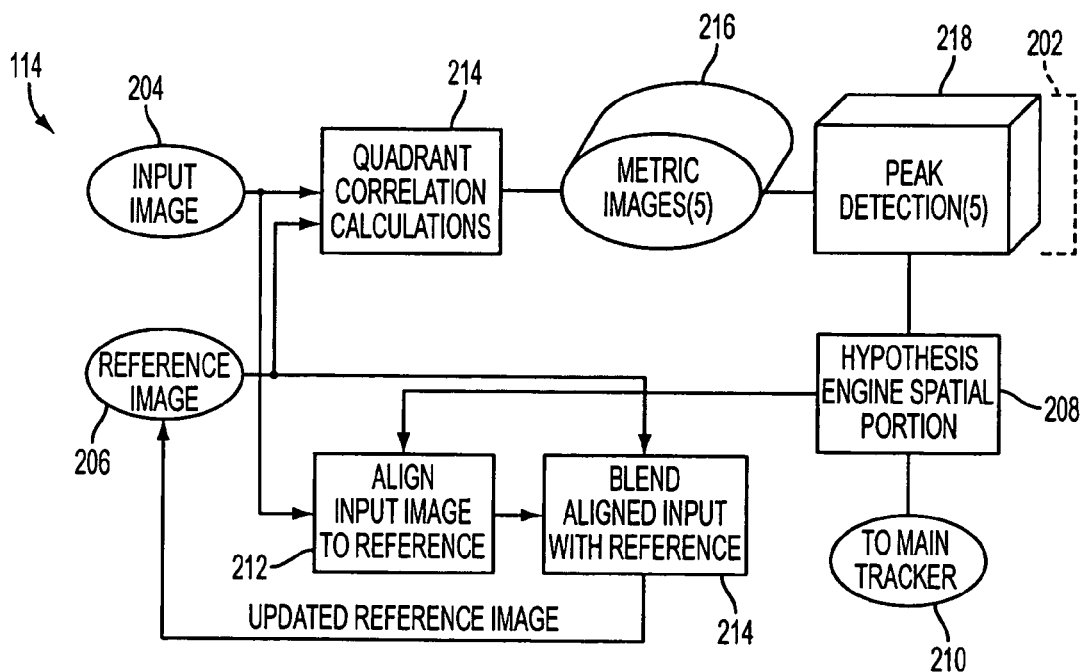
FIG. 2 shows an exemplary front end processing of the FIG. 1 embodiment, which outputs an aim-point and associated confidence value.

In operation, the correlation processor 202 of FIG. 2 receives the input image 204 after having established (e.g., selected) an acceptable reference image (e.g., via user input). The reference image and the input image can be obtained as scene imagery containing an object image of interest. Alternately, either or both of these images can be stored images. The reference image can also be a template image, containing a priori information which the user wishes to locate in the input image 204, or any other desired image.

The correlation processor 202 correlates the input image with the reference image by computing differences between the input image and the reference image using known correlation techniques. For example, the correlation processor can copy a window centered over an object image of interest (e.g., designated by the user) to create the reference image. In a successive image frame, the correlation processor can compare the reference image to an input image by sliding the reference image around a search area of the input image which corresponds in size to the centered window.

For example, the search area can be defined as an area of the input image which includes the windowed area from which the reference image was obtained in a previous frame. The search area can be sized to match the reference image size, or can be selected to be any desired amount larger than the reference image.

A sum of differences can be computed between the input image and the reference image of the input image as the reference image is moved around the search area. That is, for each position of the reference image, a sum of differences can be calculated between the two images by differencing superposed pixel values. Each summation output, corresponding to a location of the reference image over the search area can be stored and the collection of summations can be used to produce a metric surface for the reference image Thus, the metric surface created using the input image and the reference image can be generated using multiple summations computed for multiple locations of the reference image relative to the search area to produce the reference image metric surface.

A peak (or multiple possible peaks) of the metric surface can be considered to correspond to a minimum difference in pixel values between the reference image and the input image. The peak can be considered to indicate a location of the reference image which produces best match between the two images.

In a main tracker correlation, the peak can be used to determine a motion vector for determining a general direction of motion of the object image over successive image frames. In addition, if the peak satisfies a predetermined threshold criteria (e.g., the minimum difference is below some threshold value set by the user), a "good track" can be considered to exist and the reference image can be updated using all or part of the current input image.

The manner by which a reference image is updated does not constitute part of the present invention, and any known technique can be used. FIG. 2 illustrates aligning block 212 as aligning an input image with a reference image using the correlation results obtained from the tracker device 112. A blending block 214 can be used to blend an aligned input image with the reference when a "good track" indication occurs. For example, known reference image update strategies involve blending some percentage of an aligned input image with the reference image.

If a selected peak cannot be identified which satisfies the minimum difference threshold, the reference image is not updated. In this case, an indication can be provided to the user that tracking of the object image has been lost.

In addition to providing the main correlation of the tracking device, exemplary embodiments also track subcomponents of the reference image to verify their agreement. Exemplary embodiments of the present invention include a modified correlation processor 202 wherein a motion vector is generated for a subimage, or subcomponent, of the input image using a subimage metric surface. In tracking an object image, all components of the object should be moving in the same direction.

Accordingly, exemplary embodiments generate a motion vector for a subimage of the input image using a subimage metric surface. For example, an input image, or any designated portion thereof, can be subdivided into four (or more or less) equal (or unequal) quadrants. The exemplary correlation processor 202 can then perform quadrant correlation calculations. For example, additional correlation trackers are used to track four corners of an object. However, those skilled in the art will appreciate that any number of correlation trackers associated with the object image can be used and the invention is not limited to the four quadrant correlation calculations described herein.

Using the quadrant correlation trackers, a subimage metric surface can be produced for each quadrant of the object image. The subimage metric surfaces can be produced using the computations used to produce the reference image metric surface established for the input image relative to the reference image. Alternately, subimages can be derived from the input image. This can be repeated for any number of subimages (e.g., four in the exemplary quadrant correlation).

A first subimage can be compared with a first subimage reference, and a subimage metric surface can be computed in response to the comparison. This can be repeated for each subimage of the input image.

The computation of quadrant correlations from either the main tracker correlation or through the derivation of subimages is performed by quadrant correlation computation block 214. These calculations can be implemented using software configured portions of the correlation processor 202.

Figure 3:
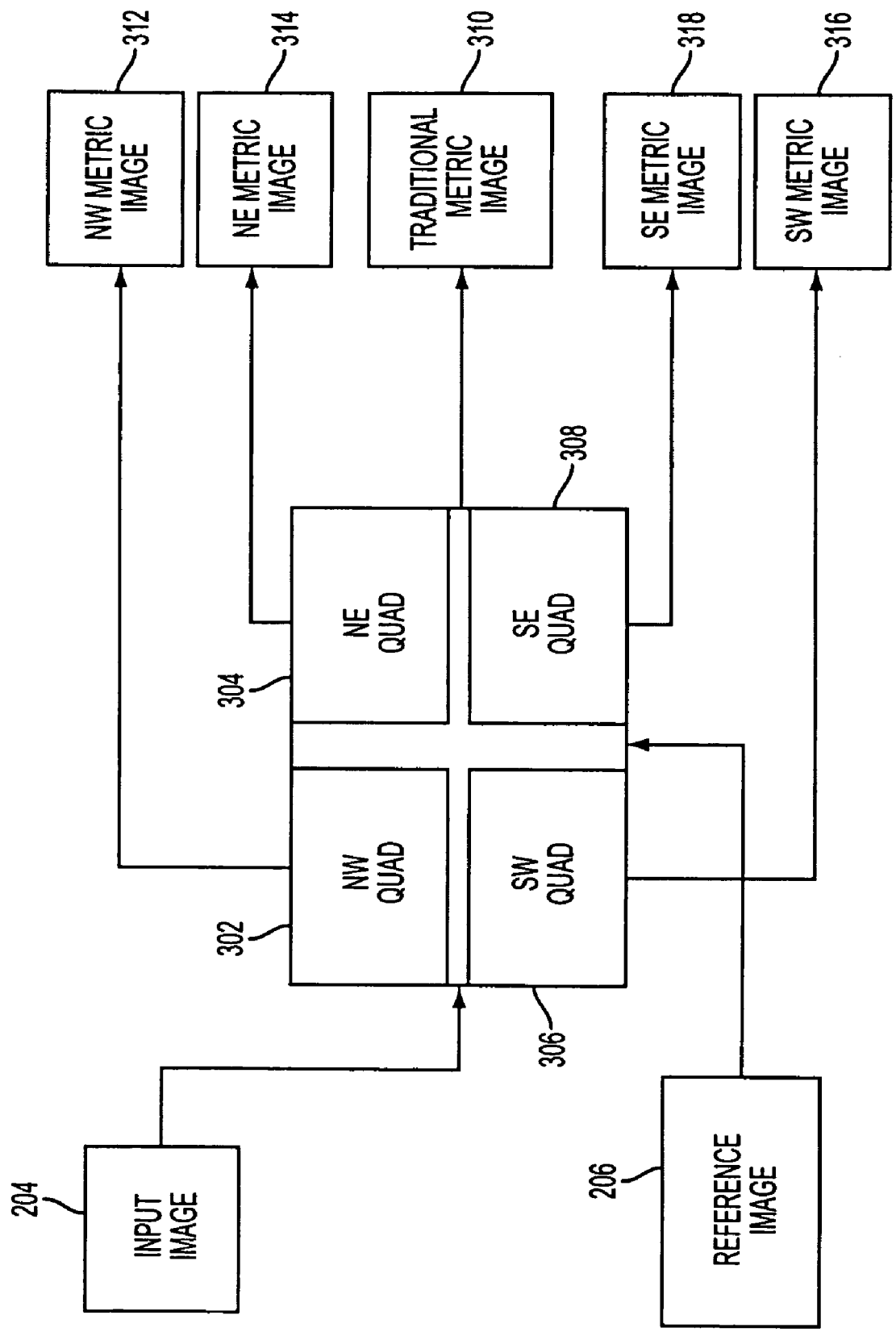
FIG. 3 illustrates an exemplary back-end temporal processor of the FIG. 1 embodiment for evaluating the aim-point and confidence value.

FIG. 3 shows an exemplary implementation of the quadrant correlation computation block 214, wherein the correlation processor 202 is used to produce a quadrant correlation for each of a northwest quadrant 302, a northeast quadrant 304, a southwest quadrant 306 and a southeast quadrant 308 of the reference image relative to the input image. In the FIG. 3 example, the same correlation data used to produce a reference image data surface for the input image relative to the reference image (as represented by traditional metric image output 310) can be used to produce a metric image for each quadrant. The quadrant images 312, 314, 316 and 318 correspond to the outputs for each of the quadrants 302-308 respectively.

The computation of the reference image metric surface and the computation of the quadrant subimage metric surfaces can be represented as follows:

Computation of the Metric Image:

$$\text{Metric}(m, n) = \sum_{i=0}^{I-1} \sum_{j=0}^{J-1} |\text{Reference}(i, j) - \text{Input}(i + m, j + n)|$$

This requires I*J subtracts, I*J absolute value operations, and (I*J)−1 addition operations for each pixel in the search area (M*N). This results in [(2*I*J)−1]*M*N addition/subtraction operations and I*J*M*N absolute value operations.

Computation of the 4 Additional Track Metrics:

$$\text{Metric}NW(m, n) = \sum_{i=0}^{I/2} \sum_{j=0}^{J/2} |\text{Reference}(i, j) - \text{Input}(i + m, j + n)|$$

$$\text{Metric}NE(m, n) = \sum_{i=0}^{I/2} \sum_{j=J/2}^{J-1} |\text{Reference}(i, j) - \text{Input}(i + m, j + n)|$$

$$\text{Metric}SW(m, n) = \sum_{i=I/2}^{I-1} \sum_{j=0}^{J/2} |\text{Reference}(i, j) - \text{Input}(i + m, j + n)|$$

$$\text{Metric}SE(m, n) = \sum_{i=I/2}^{I-1} \sum_{j=J/2}^{J-1} |\text{Reference}(i, j) - \text{Input}(i + m, j + n)|$$

Computing the 4 partial metric images costs the same number of instructions as the whole metric calculation. Adding the four partial metric images together will yield the whole metric, and can cost an additional 3*M*N add operations.

Thus, an output of the FIG. 2 quadrant correlation computation block 214, includes five metric images labeled 216. These images are used for performing five separate peak detections in portion 218 of the processor configured to perform this operation. In addition to computing a peak of the reference image metric surface for the reference image as a whole, this portion of the correlation processor 202 can compute at least one peak of each subimage metric surface, for each of one or multiple subimages derived from the input image.

Figure 4:
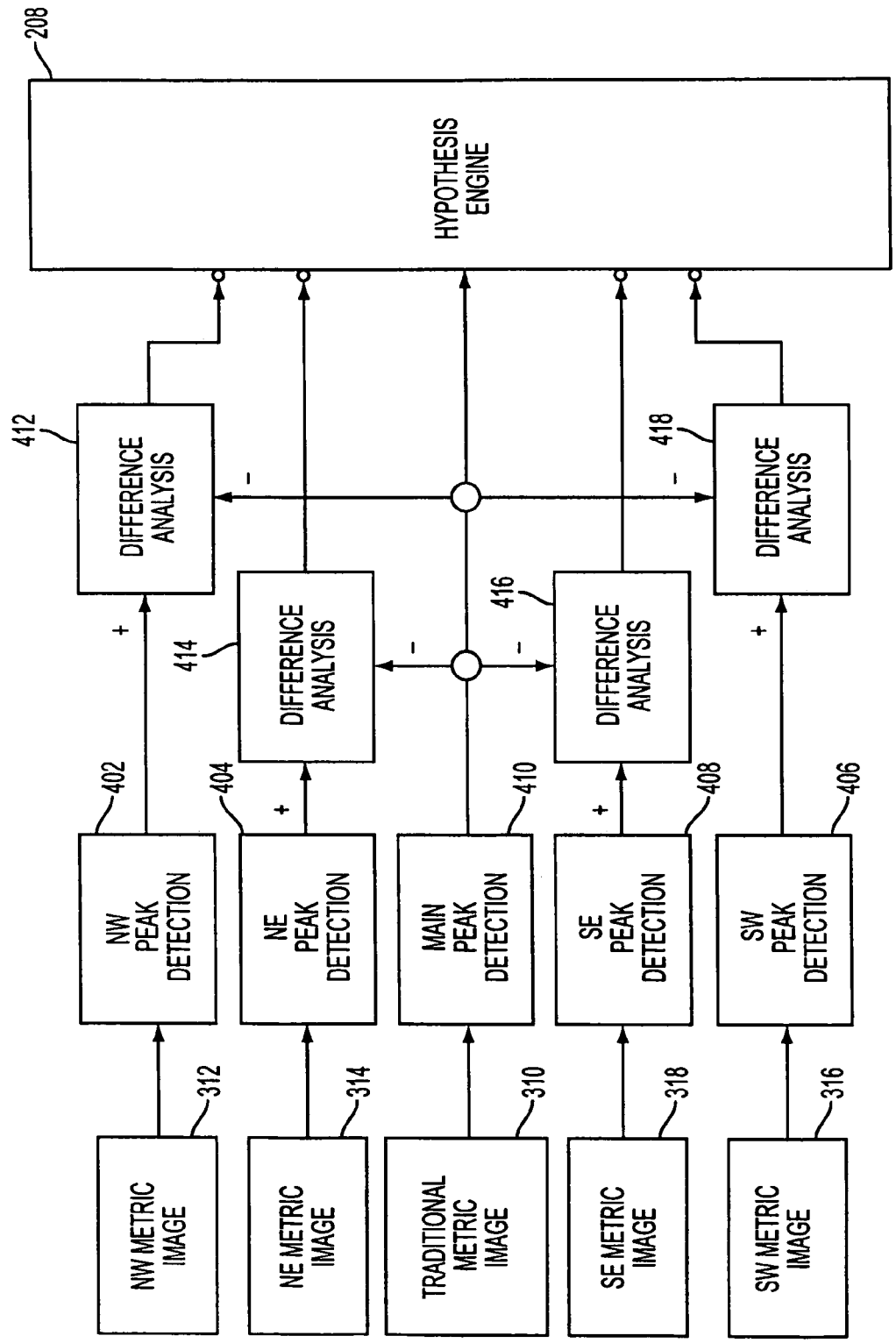
FIG. 4 shows exemplary details of a quadrant correlation calculation block of the FIG. 2 front end processing.

Referring to FIG. 4, details of an exemplary peak detection block 218 are shown to receive the five metric images 216. In FIG. 4, for each subimage metric surface, a peak detection 402, 404, 406 or 408 is provided. A main peak detection 410 is also provided with respect to the reference image metric surface 310.

Differential analysis blocks 412, 414, 416 and 418 can be used to produce motion vectors as a function of migration of peaks in different quadrants of the reference image. For example, difference analysis block 412 compares the value output by peak detection block 402 with the peak of the main tracker output by main peak detection block 410. Difference analysis block 418 compares the value output by peak detection block 406 with the peak of the main tracker output by main peak detection block 410. Difference analysis block 414 compares the value output by peak detection block 404 with the peak of the main tracker output by main peak detection block 410. Difference analysis block 416 compares the value output by peak detection block 408 with the peak of the main tracker output by main peak detection block 410.

The outputs of the differential analysis blocks 412-414 are supplied to the tracking assessment processor 208, which looks at the motion vectors and produces outputs for steering optics of the designation and tracking system. The tracking assessment processor 208 can, in an exemplary embodiment, constitute a hypothesis engine, which determines the most probable scenario (e.g., object behavior) of object image motion based on the differential analysis of the subimage peaks.

For example, if all five motion vectors agree (i.e., the motion vectors for the four quadrants agree with the motion vector for the image as a whole), the hypothesis engine can conclude that normal object translation has occurred. In this case, a high level of confidence exists that the object image has been located in the currently input image, such that the reference image can be updated with the input image. This will constitute the first possible outcome of the hypothesis engine, and likely the most prevalent object image behavior. However, five other conditions can, in an exemplary embodiment, be assessed by the hypothesis engine as follows:

In the second condition, all four quadrant vectors point toward the center of the image. This can be considered an increase in range between the tracking system and the object. This would reflect the object image becoming smaller in the field of view.

In a third condition, where all four vectors point away from the center, the hypothesis engine can conclude that a decrease in range is occurring. That is, the tracking system is moving closer to the object such that the image size is increasing within the field of view.

In a fourth condition, where all four quadrant vectors are in a direction tangential to a circle drawn about a center of rotation, object image rotation about a line of sight axis can be considered to have occurred.

In a fifth condition, where all four quadrant vectors point toward the center of a circle drawn about a rotational axis of the object image, object rotation about a line in the image plane can be considered to have occurred.

In a sixth condition, when less than all of the motion vectors agree (e.g., two or three of the motion vectors agree with the image motion as a whole), some partial obscuration of the object image can be considered to have occurred. Obscured quadrant pixel values can be monitored to determine their fall off. Where fall off occurs sharply (e.g., greater than a designated threshold), partial obscuration of an object can be considered to have occurred.

Those skilled in the art will appreciate that any logical deductions can be applied to the outputs of the motion vectors to make any assessments deemed appropriate. For example, for specific situations, specific motion vector values can be monitored and stored in a table. Upon a detection of specific motion vector scenarios during operation, a comparison can be made against the stored values to determine the most likely scenario.

Figure 5:
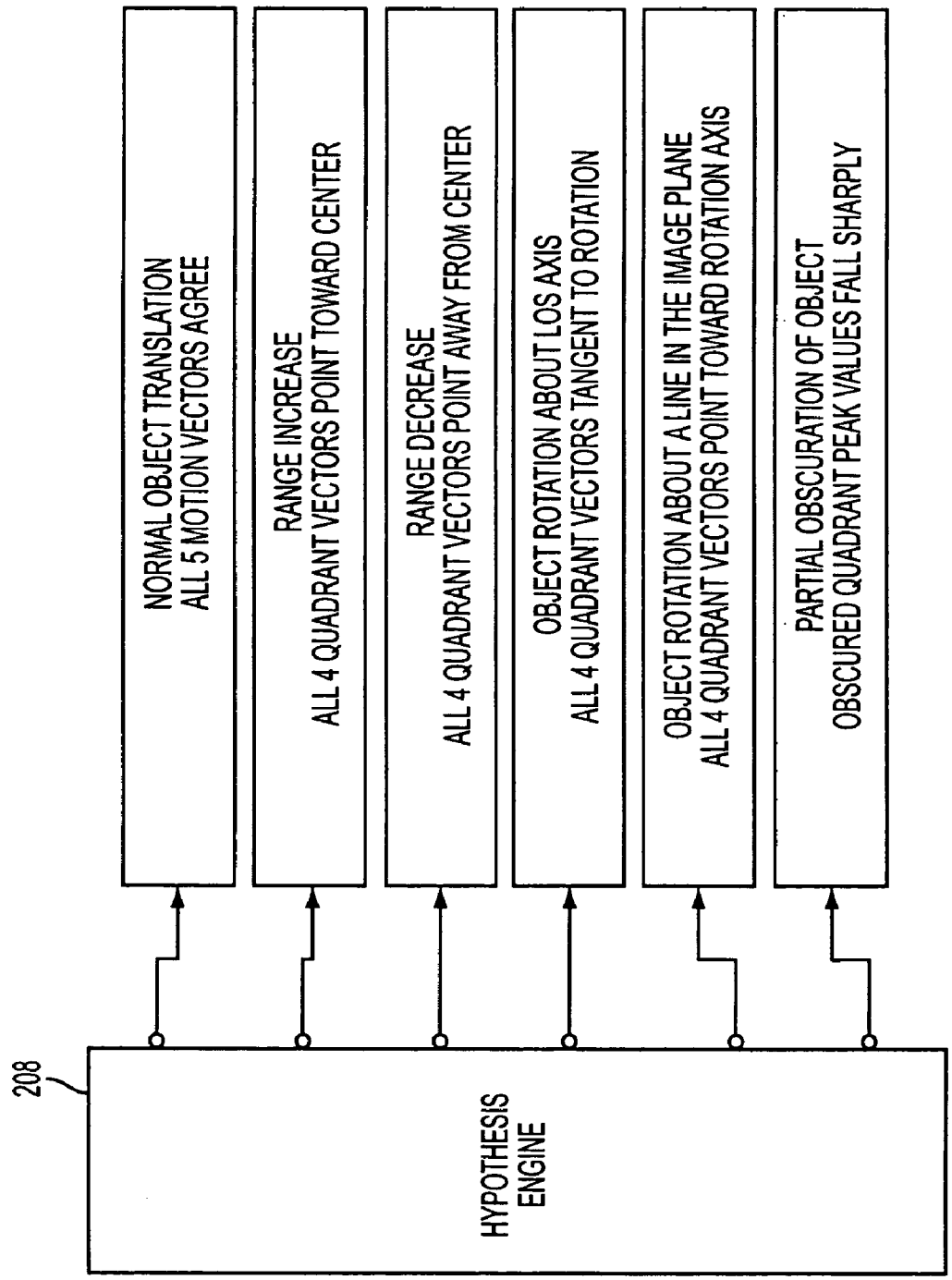
FIG. 5 illustrates details of an exemplary peak detection block in the front end processing of FIG. 2 for producing outputs to a hypothesis engine.

FIG. 5 shows the exemplary outputs from the hypothesis engine 208. In a broad sense, exemplary embodiments can be used merely to distinguish a normal condition (i.e., where all five motion vectors agree) from an abnormal situation, wherein there is a discrepancy with at least one of the motion vectors. A reference image update can be limited to those situations in which all five motion vectors agree. Such a condition constitutes a high level of confidence that motion of the object image is in the indicated direction of the five motion vectors.

Figure 6:
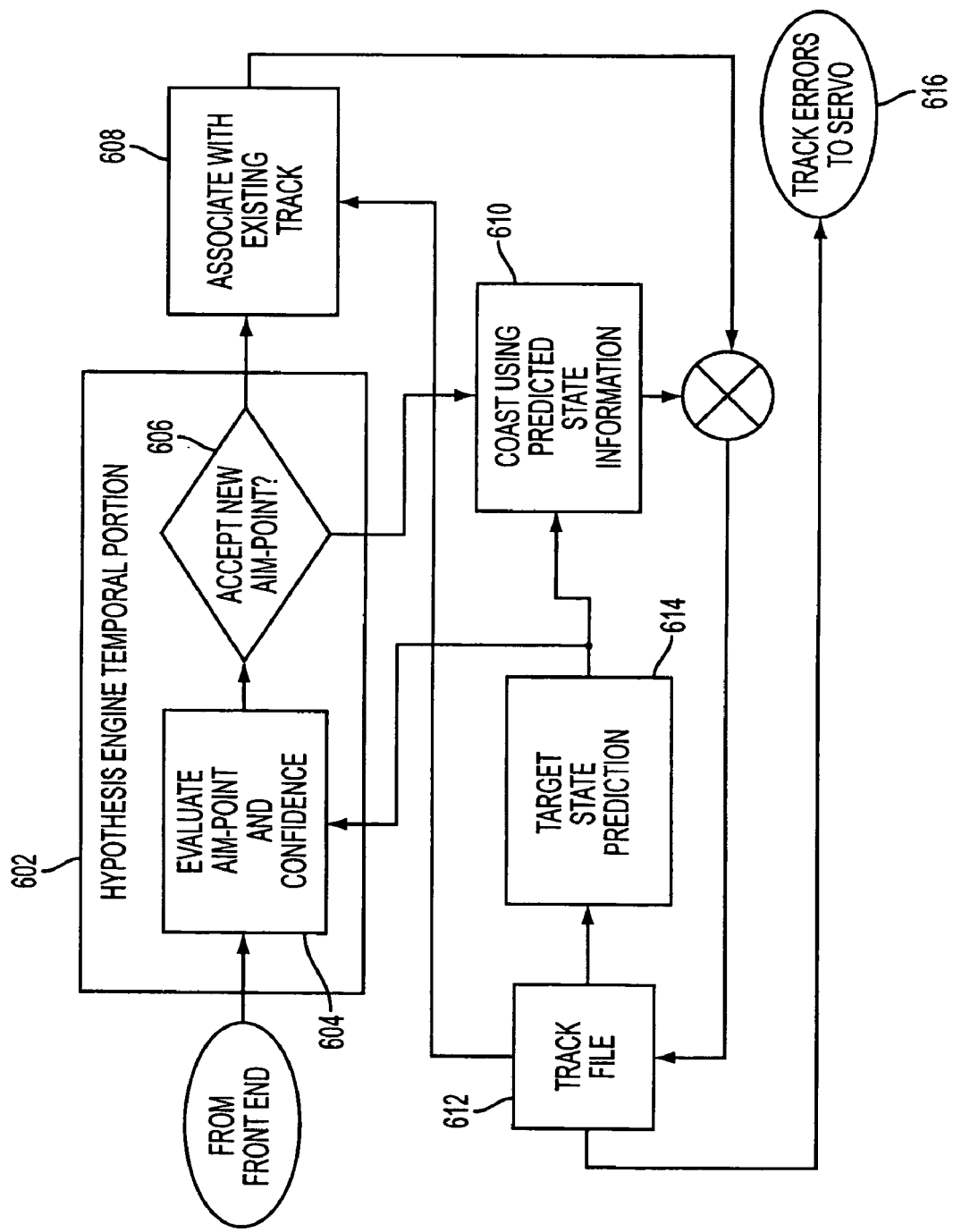
FIG. 6 shows exemplary outputs of a hypothesis engine.

FIG. 6 illustrates that signals output by the front end spatial processing block 114, and used to calculate an aimpoint and confidence value 118, can be evaluated in a temporal portion of the hypothesis engine of the tracking assessment processor 208. This evaluation can occur in a temporal portion 602 of the hypothesis engine. If the confidence value associated with a particular aimpoint exceeds a predetermined threshold, as represented by functional block 604, the new aimpoint can be accepted.

In decision block 606, where the new aimpoint is accepted, the process can flow to functional block 608 wherein the reference image is updated. Alternately, where the new aimpoint is not accepted, tracking can be deemed lost, and the process can flow to the coast mode in block 610. In this mode, other forms of information available, if any, such as predicted state information, can be used to make a best guess as to the object image location. Such predicted information can be based on stored track files 612 and the target state prediction function 614 used in conventional trackers. For example, the last reference image determined with a satisfactory level of confidence can be retained until another reference image is acquired with a high level of confidence.

Outputs from the tracking file can be used to supply tracking errors to the servo in block 616 for aiming the designation and tracking components of the FIG. 1 system.

Thus, exemplary embodiments allow a tracking assessment to be provided which measures a quality of correlation between an input image and a reference image. One of plural object behaviors can be selected using the tracking assessment.

Those skilled in the art will appreciate that implementations of exemplary embodiments described herein can be performed in existing correlation tracking systems using software to perform the functionality described herein. In this case, a computer readable medium containing a computer program can be supplied to a conventional correlation tracking system for causing one or more computers contained therein to perform the operations described.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for tracking motion of an object image, comprising:
   receiving an input image;
   correlating, in a computing system, the input image with a reference image, the correlating comprising:
      defining a search area of the input image;
      moving the reference image around the search area;
      computing a sum of differences between the input image and the reference image; and
      producing a reference image metric surface using multiple summations computed for multiple locations of the reference image relative to the search area of the input image;
   deriving multiple subimages from the input image;
   comparing each subimage with a subimage reference computing, in the computing system, a subimage metric surface for each subimage based on the comparing;
   computing, in the computing system, at least one peak for each subimage metric surface, respectively;
   computing, in the computing system, at least one peak for the reference image metric surface;
   computing, in the computing system, a motion vector for each subimage metric surface based on a result of a comparison of the at least one peak for the reference image metric surface with the computed at least one peak for each subimage metric surface, respectively;
   computing, in the computing system, a motion vector for the reference image metric surface using the computed at least one peak for the reference image metric surface; and
   outputting, from the computing system, a tracking assessment of object image motion based on the computed motion vector for each subimage metric surface, respectively, and the computed motion vector for the reference image metric surface.

2. The method according to claim 1, wherein the generating includes:
   producing the subimage metric surfaces using computations used to produce the reference image metric surface.

3. The method according to claim 1, wherein the tracking assessment identifies a quality of a correlation between the input image and the reference image.

4. The method according to claim 3, comprising:
   selecting one of plural object behaviors using the tracking assessment.

5. The method according to claim 1, wherein the reference image and the input image are obtained as scene imagery containing the object image.

6. The method according to claim 1, wherein the tracking assessment determines if the object image is at least one of:
   translating within the image plane;
   moving further away from an object sensor;
   moving closer to the object sensor;
   rotating within the image plane;
   rotating about a line in the image plane; and
   becoming partially obscured.

7. The method according to claim 1, comprising controlling at least one of a servo, a weapon, a missile, a target designator, steering optics, and a display, in accordance with the tracking assessment.

8. A method for tracking motion of an object image, comprising:
   receiving an input image;
   correlating, in a computing system, the input image with a reference image to produce a reference image metric surface, the correlating comprising computing differences between the input image and the reference image;
deriving a first subimage from the input image;
comparing the first subimage with a first subimage reference;
computing, in the computing system, a subimage metric surface based on the comparing;
computing, in the computing system, at least one peak for the subimage metric surface
computing, in the computing system, at least one peak for the reference image metric surface;
computing, in the computing system, a motion vector for the subimage metric surface based on a result of a comparison of the at least one peak for the reference image metric surface with the computed at least one peak for the subimage metric surface;
computing, in the computing system, a motion vector for the reference image metric surface using the computed at least one peak for the reference image metric surface; and
outputting, from the computing system, a tracking assessment of object image motion based on the computed motion vector for the subimage metric surface and the computed motion vector for the reference image metric surface.

9. The method according to claim 8, comprising controlling at least one of a servo, a weapon, a missile, a target designator, steering optics, and a display, in accordance with the tracking assessment.

10. A system for tracking motion of an object image comprising:
a processor configured to correlate an input image with a reference image by
defining a search area of the input image;
moving the reference image around the search area;
computing a sum of differences between the input image and the reference image; and
producing a reference image metric surface using multiple summations computed for multiple locations of the reference image relative to the search area of the input image; wherein the processor is further configured to
derive multiple subimages from the input image;
compare each subimage with a subimage reference; and
compute a subimage metric surface for each subimage based on the comparison;
compute at least one peak for each subimage metric surface, respectively;
compute at least one peak for the reference image metric surface;
compute a motion vector for each subimage metric surface based on a result of a comparison of the at least one peak for the reference image metric surface with the computed at least one peak for each subimage metric surface, respectively; and
compute a motion vector for the reference image metric surface using the computed at least one peak for the reference image metric surface;
wherein the system further comprises a tracking assessment processor configured to output a tracking assessment of object image motion based on the computed motion vector for each subimage metric surface, respectively, and the computed motion vector for the reference image metric surface.

11. The system according to claim 10, comprising:
steering optics connected with the tracking assessment processor, and controlled in response to an output of the tracking assessment processor.

12. The system according to claim 10, wherein the tracking assessment processor is configured to determine if the object image is at least one of:
translating within the image plane;
moving further away from an object sensor;
moving closer to the object sensor;
rotating within the image plane;
rotating about a line in the image plane; and
becoming partially obscured.

13. A computer readable medium containing a computer program that causes a computer to perform steps of:
receiving an input image;
correlating the input image with a reference image, the correlating comprising:
defining a search area of the input image;
moving the reference image around the search area;
computing a sum of differences between the input image and the reference image; and
producing a reference image metric surface using multiple summations computed for multiple locations of the reference image relative to the search area of the input image;
deriving multiple subimages from the input image;
comparing each subimage with a subimage reference
computing a subimage metric surface for each subimage based on the comparing;
computing at least one peak for each subimage metric surface, respectively;
computing at least one peak for the reference image metric surface;
computing a motion vector for each subimage metric surface based on a result of a comparison of the at least one peak for the reference image metric surface with the computed at least one peak for each subimage metric surface, respectively;
computing a motion vector for the reference image metric surface using the computed at least one peak for the reference image metric surface; and
outputting a tracking assessment of object image motion based on the computed motion vector for each subimage metric surface, respectively, and the computed motion vector for the reference image metric surface.

14. The computer readable medium according to claim 13, wherein the tracking assessment identifies a quality of a correlation between the input image and the reference image.

15. The computer readable medium according to claim 13, wherein the reference image and the input image are obtained as scene imagery containing the object image.

16. The computer readable medium according to claim 13, wherein the computer readable medium causes the computer to output the tracking assessment and causes the computer to determine if the object image is at least one of:
translating within the image plane;
moving further away from an object sensor;
moving closer to the object sensor;
rotating within the image plane;
rotating about a line in the image plane; and
becoming partially obscured.

17. A computer readable medium containing a computer program that causes a computer to perform steps of:
receiving an input image;
correlating the input image with a reference image to produce a reference image metric surface, the correlating comprising computing differences between the input image and the reference image;
deriving a first subimage from the input image;

comparing the first subimage with a first subimage reference;

computing a subimage metric surface based on the comparing;

computing at least one peak for the subimage metric surface;

computing at least one peak for the reference image metric surface;

computing a motion vector for the subimage metric surface computed based on a result of a comparison of the at least one peak for the reference image metric surface with the computed at least one peak for the subimage metric surface;

computing a motion vector for the reference image metric surface using the computed at least one peak for the reference image metric surface; and outputting a tracking assessment of object image motion based on the computed motion vector for the subimage metric surface and the computed motion vector for the reference image metric surface.

18. A system for tracking motion of an object image, comprising:

means for receiving an input image;

means for correlating the input image with a reference image by
defining a search area of the input image,
moving the reference image around the search area,
computing a sum of differences between the input image and the reference image, and
producing a reference image metric surface using multiple summations computed for multiple locations of the reference image relative to the search area of the input image;

means for generating a plurality of motion vectors by deriving multiple subimages from the input image,
comparing each subimage with a subimage reference
computing a subimage metric surface for each subimage based on the comparing,
computing at least one peak for each subimage metric surface, respectively,
computing at least one peak for the reference image metric surface,
computing a motion vector for each subimage metric surface based on a result of a comparison of the at least one peak for the reference image metric surface with the computed at least one peak for each subimage metric surface, respectively, and
computing a motion vector for the reference image metric surface using the computed at least one peak for the reference image metric surface; and means for outputting a tracking assessment of object image motion based on the computed motion vector for each subimage metric surface, respectively, and the computed motion vector for the reference image metric surface.

19. The system according to claim 18, wherein the means for receiving comprises an optical sensor.

20. The system according to claim 18, wherein the means for correlating is a computer processor.

21. The system according to claim 18, wherein the means for outputting is a portion of a computer processor configured as a tracking assessment processor having a hypothesis engine.

22. The system according to claim 18, comprising: an aiming/positioning system controlled in response to the outputting means.

23. The system according to claim 18, wherein the means for outputting the tracking assessment determines if the object image is at least one of:

translating within the image plane;
moving further away from an object sensor;
moving closer to the object sensor;
rotating within the image plane;
rotating about a line in the image plane; and
becoming partially obscured.

* * * * *

UNITED STATES PATENT AND TRADEMARK OFFICE
CERTIFICATE OF CORRECTION

PATENT NO.         : 7,650,016 B2                                       Page 1 of 1
APPLICATION NO. : 10/902372
DATED              : January 19, 2010
INVENTOR(S)        : V Edward Gold, Jr.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1004 days.

Signed and Sealed this

Twenty-third Day of November, 2010

David J. Kappos
*Director of the United States Patent and Trademark Office*